US011899912B2

(12) United States Patent
Khatri

(10) Patent No.: US 11,899,912 B2
(45) Date of Patent: Feb. 13, 2024

(54) SMART FILTERING IN AN OVERVIEW PAGE

(71) Applicant: SAP SE, Walldorf (DE)

(72) Inventor: Leena Khatri, Bangalore (IN)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 17/715,363

(22) Filed: Apr. 7, 2022

(65) Prior Publication Data
US 2023/0325057 A1 Oct. 12, 2023

(51) Int. Cl.
G06F 3/048 (2013.01)
G06F 3/0484 (2022.01)
G06Q 10/0631 (2023.01)

(52) U.S. Cl.
CPC ..... G06F 3/0484 (2013.01); G06Q 10/06313 (2013.01)

(58) Field of Classification Search
CPC ............ G06F 3/0484; G06Q 10/06313
See application file for complete search history.

(56) References Cited

U.S. PATENT DOCUMENTS

| 8,812,960 | B1* | 8/2014 | Sun | G06F 16/2465 715/757 |
| 10,521,077 | B1* | 12/2019 | Beran | G06F 3/0482 |
| 11,282,012 | B1* | 3/2022 | Mandaro | G06Q 10/0633 |
| 11,409,756 | B1* | 8/2022 | Park | G06F 16/254 |
| 2012/0083260 | A1* | 4/2012 | Arriola | G06F 16/252 455/418 |
| 2014/0317104 | A1* | 10/2014 | Isaacs | G06F 16/332 707/728 |
| 2015/0356160 | A1* | 12/2015 | Berwick | G06F 3/04817 715/781 |
| 2016/0189077 | A1* | 6/2016 | Azmoon | G06Q 10/109 705/7.26 |
| 2016/0210440 | A1* | 7/2016 | Munafo | G16Z 99/00 |
| 2016/0339336 | A1* | 11/2016 | Matsui | A63F 13/533 |
| 2016/0342590 | A1* | 11/2016 | Paulin | G06F 16/93 |
| 2017/0017903 | A1* | 1/2017 | Gray | G06T 11/60 |
| 2017/0118308 | A1* | 4/2017 | Vigeant | H04N 7/15 |
| 2017/0235436 | A1* | 8/2017 | Hooton | G06F 3/04817 705/7.11 |
| 2017/0329500 | A1* | 11/2017 | Grammatikakis | G06F 3/0483 |
| 2018/0308141 | A1* | 10/2018 | Beck | G06Q 20/347 |
| 2019/0051411 | A1* | 2/2019 | Miller | G16H 50/30 |
| 2020/0080862 | A1* | 3/2020 | Pluciennik | G01C 21/3679 |
| 2020/0097303 | A1* | 3/2020 | O'Kane | G06F 16/24575 |
| 2020/0097847 | A1* | 3/2020 | Convertino | G06F 11/3447 |
| 2020/0117658 | A1* | 4/2020 | Venkata | G06F 16/248 |

(Continued)

Primary Examiner — Linh K Pham
(74) Attorney, Agent, or Firm — Buckley, Maschoff & Talwalkar LLC

(57) ABSTRACT

According to some embodiments, systems and methods are provided, comprising: a memory storing executable program code; and a processing unit to execute the executable program code to cause the system to: generate a visualization of a plurality of cards, wherein each card displays at least one dimension; receive a value of a first dimension; and in response to reception of the value: determine an association between one or more of the plurality of cards and the first dimension; and dynamically modify the visualization by emphasizing the one or more of the plurality of cards based on the association. Numerous other aspects are provided.

18 Claims, 21 Drawing Sheets

(56) References Cited

U.S. PATENT DOCUMENTS

| | | | | |
|---|---|---|---|---|
| 2020/0301939 A1* | 9/2020 | Hollander | ........... | G06F 16/2471 |
| 2020/0357258 A1* | 11/2020 | Hardy | ................. | G06F 11/3013 |
| 2021/0110897 A1* | 4/2021 | Ginsburg | ............... | G16H 10/60 |
| 2021/0181922 A1* | 6/2021 | Chang | ................. | G06F 3/04817 |
| 2021/0342766 A1* | 11/2021 | Wu | ....................... | G06F 16/248 |
| 2022/0092503 A1* | 3/2022 | Clark | ..................... | G06Q 10/06 |
| 2022/0147205 A1* | 5/2022 | Koste | ...................... | G06F 9/451 |

* cited by examiner

300A

| | | | GROUPING Y N |
|---|---|---|---|
| DISPLAY CURRENCY | COMPANY CODE | SUPPLIER | COUNTRY/REGION KEY |
| EUR | | | |
| POSTING DATE | BUSINESS AREA | ITEM PAYMENT BLOCK | GO  Adapt Filters (1) |

─118              ─350

Parked Invoices
Average Days
28.0
As of Today

By amount in
Document Curr...

00103 05/03/2021
1010 (Co. Code) 4.8Eur
51090

116

Blocked Invoices–Chart View
Total |
40.62k
As of today

By Aging ▽

Amount in DT by Days in Arre...| EUR 100  90  80

Blocked Invoices
Total
As of Today
By Cash
No Data

Suppliers with Debit Balances
Total | EUR
130.24K
As of today
Supplier B
Supplier C Days Payable Outstanding Direct
DPO Average–Last 12 Months
75.1
In days DPO by month Quick Links
○ Manage Supplier Line Items
○ Approve Bank Payments
○ My Inbox My Inbox
By Priority
All Payment Batch 001
Workflow Runtime
07/30/2021

Payment Batch 002
Workflow Runtime
07/26/2021

| | | | | GROUPING | Y | N |

| DISPLAY CURRENCY | COMPANY CODE | SUPPLIER | COUNTRY/REGION KEY |
| EUR | | SUPPLIER A | |
| POSTING DATE | BUSINESS AREA | ITEM PAYMENT BLOCK | |

GO  Adapt Filters (1)

Parked Invoices
Average Days
28.0
As of Today

By amount in Document Curr...

00103 05/03/2021
1010 (Co. Code) 4.8Eur
51090

00103 05/06/2021
1010 (Co. Code) 1.8USD
51091

Blocked Invoices—Chart View
Total |
40.62k
As of today

By Aging ▽

Amount in DT by Days in Arre...| EUR 100  90  80

Blocked Invoices
Total

As of Today
By Cash ▽

No Data

Days Payable Outstanding Direct
DPO Average—Last 12 Months
75.1
In days

DPO by month
days payable outstanding

Quick Links
○ Manage Supplier Line Items
○ Approve Bank Payments
○ My Inbox

Suppliers with Debit Balances
Total | EUR
130.24k
As of today
Supplier B
Supplier C

My Inbox
By Priority
All ▽

Payment Batch 001
Workflow Runtime
07/30/2021

Payment Batch 002
Workflow Runtime
07/26/2021

| GROUPING | Y | N |

DISPLAY CURRENCY: EUR
COMPANY CODE: A
SUPPLIER:
COUNTRY/REGION KEY:
POSTING DATE:
BUSINESS AREA:
ITEM PAYMENT BLOCK:
[GO] [Adapt Filters (2)]

— 118
— 350

Parked Invoices
Average Days
28.0
As of Today

By amount in Document Curr...

00103 05/03/2021
1010 (Co. Code) 4.8Eur
51090

00103 05/06/2021
1010 (Co. Code) 1.8USD
51091

116

Blocked Invoices–Chart View
Total |
40.62k
As of today

By Aging ▽

Amount in DT by Days in Arre...| EUR

100 | 90 | 80

Blocked Invoices
Total
As of Today
By Cash
No Data

Suppliers with Debit Balances
Total | EUR
164.24K
As of today
Supplier B
Supplier C

Days Payable Outstanding Direct
DPO Average–Last 12 Months
75.1
In days

DPO by month
Company A
*days payable outstanding*

Quick Links
○ Manage Supplier Line Items
○ Approve Bank Payments
○ My Inbox

My Inbox
By Priority
All ▽

Payment Batch 001
Workflow Runtime
07/30/2021

Payment Batch 002
Workflow Runtime
07/26/2021

FIG. 3C

| CARD ID | DIMENSIONS | MEASURES | LAYOUT INFO. |
|---|---|---|---|
| A | CURRENCY (1)<br>COMPANY CODE (4)<br>POSTING DATE (3)<br>COUNTRY/REGION (2)<br>BUSINESS AREA (5)<br>ITEM PAYMENT BLOCK (6) | | |
| B | CURRENCY (1)<br>COMPANY CODE (2)<br>SUPPLIER (3)<br>POSTING DATE (4)<br>COUNTRY/REGION KEY (5)<br>BUSINESS AREA (6)<br>ITEM PAYMENT BLOCK (7) | | |
| C | COMPANY CODE (3)<br>COUNTRY/REGION KEY (1)<br>BUSINESS AREA (2) | | |

| | | | 1004 — 1002 — 1006 |
|---|---|---|---|
| | | | GROUPING  Y  N  HELP |

DISPLAY CURRENCY  COMPANY CODE  SUPPLIER  COUNTRY/REGION KEY

POSTING DATE  BUSINESS AREA  ITEM PAYMENT BLOCK  GO

FILTER  CARD
Curr...  Parked Inv...
        Blocked Inv...
        Suppliers...
Posting
Date    Days Payable
Coun... All
.       .
.       .
.       .

Parked Invoices
Average Days
28.0
As of Today

By amount in
Document Curr...

00103 05/03/2021
1010 (Co. Code) 4.8Eur
51090

00103 05/06/2021
1010 (Co. Code) 1.8USD
51091

Blocked Invoices–Chart View
Total |
40.62k
As of today

By Aging ▼

Amount in DT by Days in Arre...|

100  90  80  70

Blocked
Total
...
As of Today

By Cash... ▼

No Data

Suppliers with Debit Balances
Total
164.24K
As of today

Days Payable
Outstanding Direct
DPO Average–Last 12 Months
75.1
In days

DPO by month
*days payable outstanding*

Quick Links
● Manage Supplier Line Items
● Approve Bank Payments
● My Inbox

My Inbox
By Priority
All ▼

Payment Batch 001
Workflow Runtime
07/30/2021

Payment Batch 002
Workflow Runtime
07/26/2021

| SECTION | DIMENSIONS | CARD |
|---------|------------|------|
| 1 | | A<br>B<br>C |
| 2 | | A<br>B |
| 3 | | C |

FIG. 15

SMART FILTERING IN AN OVERVIEW PAGE

BACKGROUND

An enterprise may make use of multiple applications to manage and perform day-to-day activities. Additionally, a user may execute a single application to provide multiple types of information. For example, an accounts payable manager may use an invoice application to see paid invoices and blocked invoices, and another application to see cash discount utilization. A user interface may provide an overview of information related to different aspects of a user's day-to-day activities. For the accounts payable manager, a same user interface may provide a summary of paid invoices, blocked invoices and cash discount utilization, for example. Some user interfaces may allow the user to manipulate the displayed information. The effect of these manipulations may be displayed on an updated user interface in a fraction of a second. It may be difficult for a user to understand how the displayed information changed in response to the manipulation since there are so many cards on the page and it is difficult to understand the relationship so quickly.

Systems and methods are desired which make it easier to observe the effects of the data manipulation.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 3A is a diagram illustrating the user interface of FIG. 1B after execution of the modification and including blurring according to some embodiments.

FIG. 3B is a diagram illustrating the user interface of FIG. 3A after execution of an additional modification according to some embodiments.

FIG. 3C is a diagram illustrating the user interface of FIG. 1A after execution including two values to modify the user interface and including blurring according to some embodiments.

FIG. 6 is a database of filter dimensions according to some embodiments.

FIG. 9 is a diagram illustrating a user interface including selection of a "N" grouping indicator according to some embodiments.

FIG. 10 is a diagram illustrating a user interface including a window according to some embodiments.

FIG. 13A is a diagram illustrating the user interface of FIG. 12 including card examples according to some embodiments.

FIG. 15 is a table according to some embodiments.

Figure 1A:
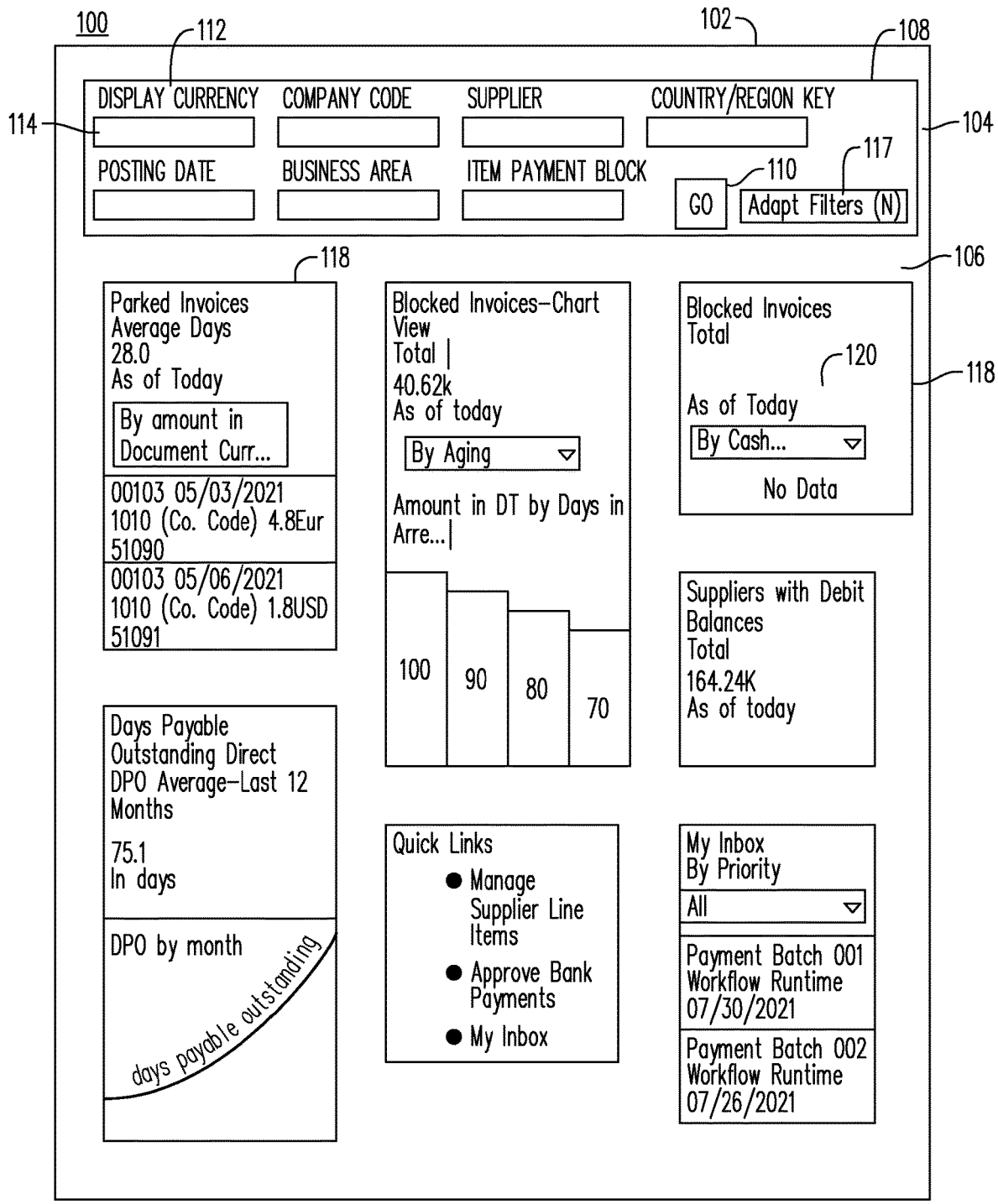
FIG. 1A is a diagram illustrating a user interface which includes an initial overview page according to some embodiments.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein. It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, the effects of manipulations of a display, such as application of a filter, may be displayed on an updated user interface in a fraction of a second. It may be difficult for a user to appreciate how the displayed information changed in response to the manipulation since the effect of the manipulation occurs so quickly. This may particularly be the case when the user interface has some elements that are changed by the manipulation and other elements that are unchanged by the manipulation.

As an example, consider a user interface (UI) that displays an overview page as a visualization for a user. The overview page may include different data elements that are targeted to a specific user and may provide that user with a summary, including content from different sources, shown side-by-side, without the user having to switch screens. The overview page may bring together information from different sources that support a specific task or information need. Continuing with the example of the accounts payable manager, a single user interface may provide a summary of paid invoices, blocked invoices and cash discount utilization. A non-exhaustive example of the overview page may be the Overview Page (OVP)® provided for SAP Fiori®, which is a data-driven SAP Fiori app type and floorplan. While the examples described herein may be with respect to OVP, the systems and processes described herein are applicable to other suitable overview pages.

The overview page may provide a visualization of information a user needs in a single page, based on the user's specific domain or role. The overview page visualization may allow the user to focus on the most important tasks, and view, filter and react to information quickly. Each topic or task may be represented on the overview page by a card (or content container), and may be visualized in different ways (e.g., texts, charts, lists, tables). The overview page may act as a UI framework for organizing multiple cards on a single page. The cards may provide annotated views of application data that may be tailored to the domain or role. The overview page may retrieve the application data from each of the applications for display on the appropriate card.

FIG. 1A illustrates a non-exhaustive example of a user interface 100 including visualization of an overview page 102 that may be manipulated by a user. In the examples of FIGS. 3A, 3B, the examples are directed to different outputs in response to user manipulation. However, it should be appreciated that the example embodiments are not limited to manipulations of these particular types (e.g., filter) or values (e.g., EUR). Other suitable types and values may be used.

Referring to FIG. 1A, the visualization of the overview page 102 may include a header area 104 and a content area 106. The header area 104 may include a filter bar 108. In some embodiments, the filter bar 108 may be used with a "Go" button 110 to execute filter selections. In some embodiments, the filter bar 108 may be used with a live update mode, such that the results are updated immediately whenever a user changes a filter field, without having to select a "Go" button 110. The filter bar 108 may include a plurality of filterable dimensions 112. The filterable dimensions 112 include, but are not limited to, Display Currency, Posting Date, Company Code, Business Area, Supplier, Item Payment Block and Country/Region Key. The filter bar 108 may also include an associated user entry field 114 for each filterable dimension 112, where the user entry field 114 may receive a value 116 (FIG. 1B) that may be used to modify the cards. As will be appreciated, rather than using a text/data-entry field to input a dimension value, the user interface may include a drop down or other menu with selectable values. The filter bar 108 may also include an adapt filters indicator 117 that may indicate the number of filters applied to the cards.

The content area 106 may include a plurality of cards 118 or containers to present the content 120 for each task. The cards 118 are containers for application content and may represent an entry-level view of the most pertinent app data for a given topic or issue. The visualization of the overview page 102 may include several cards that reference the same underlying application. From the visualization of the overview page, the user may decide which issue needs attention, and navigates via the cards 118 to the relevant application. The cards may show a chart, a list, a table, informative text, or a combination of elements. Cards may vary in size, depending on a particular layout. For example, the cards 118 may be arranged in a fixed layout, with a predefined width and height or a resizable layout. Each card 118 may display one or more dimensions 112 and values 116 for the dimension. Here, the Parked Invoices card 118 includes the dimension "Display Currency" with values of EUR and USD.

Figure 1B:
FIG. 1B is a diagram illustrating the user interface of FIG. 1A which includes entry of a value to modify the user interface according to some embodiments.

Turning to FIG. 1B, a visualization of the user interface 100 of FIG. 1A is provided, including the input of a value 116 in one of the user entry fields 114 for a filterable dimension 112. In this particular non-exhaustive example, the value "EUR" 116 is input to the user entry field 114 for the "Display Currency" filterable dimension. To apply the value 116 to the cards, the user may select the "Go" button 110, as shown herein.

Selection of the "Go" button 110 (or in a live update mode, entry of the value) may result in the application of the value 116 to the cards and the generation of an updated visualization.

Figure 2:
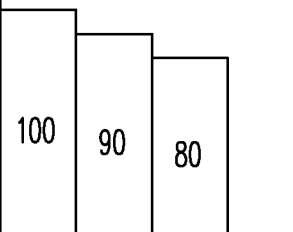
FIG. 2 is a diagram illustrating a user interface including a conventional updated display.

A conventionally updated user interface 200 is shown in FIG. 2, and reflects the application of the filter values, for example EUR in the Display Currency dimension, to the cards. As compared to the cards 118 shown in FIG. 1B, some of the cards displayed in FIG. 2 have been updated based on application of the filter value. For example, content in the Parked Invoices card 202, the Blocked Invoices—Chart view Card 204, and Suppliers with Debit Balances Card 206, has been updated to only include EUR data values, while the other cards (Days Payable Outstanding Direct DPO Average, Quick Links, Blocked Invoices Total, My Inbox) remained unchanged. As used herein, the terms "update" and "modify," may be used interchangeably. As described above, execution of the filter value and the display of the updated cards may occur in a fraction of a second. As such, after the update it may not be readily obvious to the user which cards have been updated. Further, while only seven cards are shown in this user interface, the user interface may include many more cards. As the number of cards increases, the cognitive load on the user increases, making it more difficult for the user to easily identify which cards have been updated.

An updated/modified visualization is shown in user interface 300A (FIG. 3A), in accordance with some embodiments, and reflects the application of the filter values, for example EUR in the Display Currency dimension, to the cards. A plurality of cards 118 are generated in the visualization and displayed on a user interface 300A. Each of the cards 118 displays at least one dimension of the dimensions in the filter bar, and a value 116 for the dimension. As described above, in FIG. 1B, the user entered a value 116 of "EUR" in the Display Currency dimension 112. Based on execution of application of the filter value 116 to the cards 118 (e.g., via user selection of the "Go" button 110 or automatically in a live update mode, as described above), the visualization of the cards as displayed on the user interface is dynamically modified. In particular, as compared to the cards 118 shown in FIG. 1B, the cards 118 in FIG. 3A have been updated based on application of the filter value 116.

The visualization of the cards is modified by emphasizing one or more of the plurality of cards based on an association between the card and the received dimension value. The emphasis may be to visually emphasize the card(s) that do have an association with the received dimension value or the card(s) that do not have an association with the received dimension value. Here, the emphasis is on the cards that do not have an association with the received dimension value (i.e., do not include the received value and are not affected by application of the filter value 116), and the emphasis is that these cards are blurred. Based on application of the EUR input, and the dimension filter module's 745 (FIG. 7) analysis, as described further below, the dimension filter module 745 determines the content of the Parked Invoices Card, the Blocked Invoices Card and the Suppliers with Debit Balances Card are affected by the EUR input. The dimension filter module 745 may then trigger a focus action (or other suitable operation) on the cards not affected by the EUR input to replace the images of these cards on the user interface with generated blurred cards 350 in a dynamically modified visualization. Here, the Blocked Invoices Total Card, the Days Payable Card, the Quick Links Card and the My Inbox card 350 are the blurred cards as they are not affected by the EUR input. As will be appreciated, rather than using blurring, the visual emphasis may be that the unaffected cards (or the affected cards) are visualized in different colors, or the like. By using blurring or shading, for example, the user can easily observe which cards were updated/modified. That is, the user can quickly notice which cards were updated by simply noting the cards that are still visible. Thus, a user does not need to know which cards include that dimension value and may have been modified by application of the filter prior to application of the filter.

FIG. 3B illustrates a visualization shown in user interface 300B further modifying the updated visualization shown in user interface 300A, in accordance with some embodiments, and reflects the application of another filter value, for example Supplier A in the Supplier dimension to the cards. Here, with both filter values (EUR and Supplier A) being applied to the cards 118, in addition to the blurred cards in FIG. 3A, the Suppliers with Debit Balances card is also blurred as the content of this card does not include Supplier A.

FIG. 3C illustrates a visualization shown in user interface 300C in accordance with some embodiments, and reflects the application of two filter values, for example EUR in the Display Currency dimension and Company A, to the cards at a same time (unlike FIG. 3B, which describes successive application of filters). Here, with both filters (EUR and Company A) being applied to the cards 118, less cards are blurred than in FIG. 3A (i.e., Days Payable Outstanding Direct DPO Average), as more cards are affected.

Figure 4:
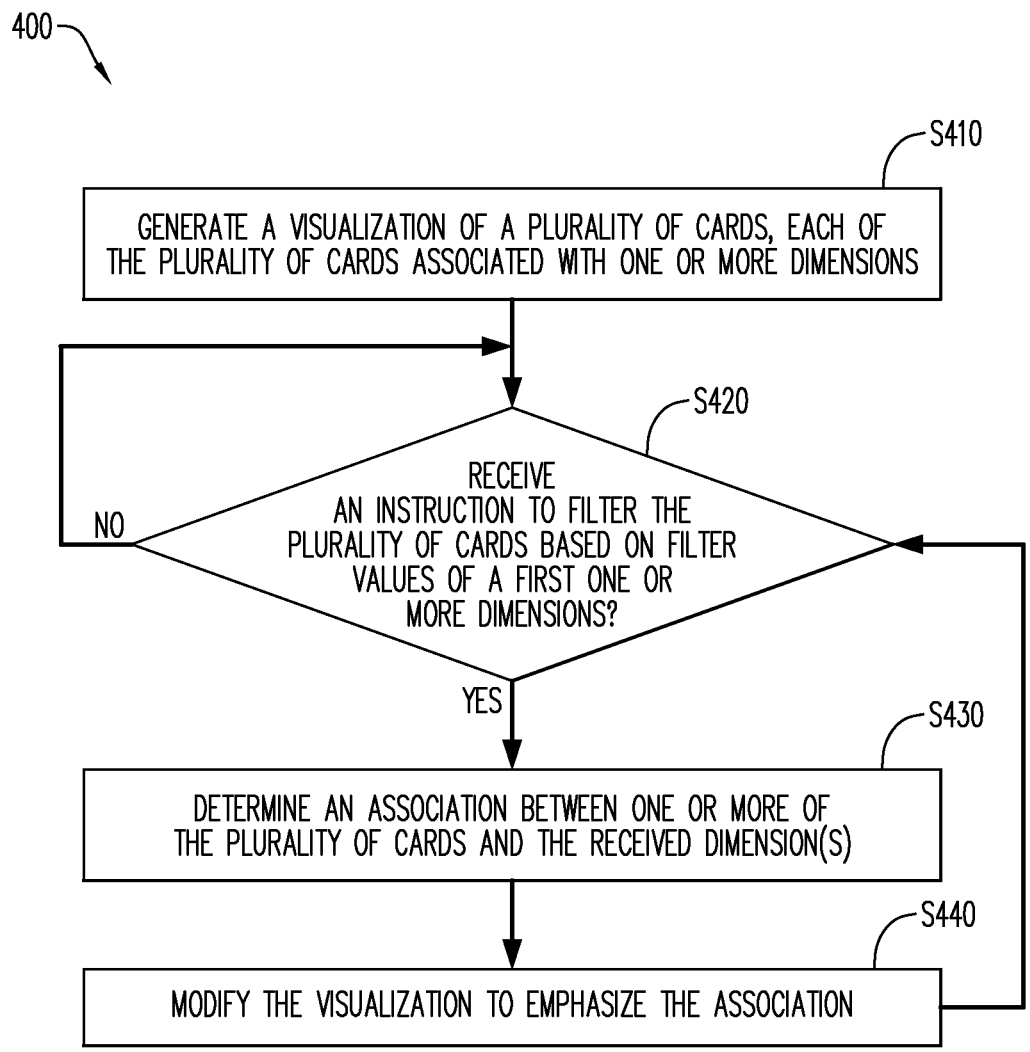
FIG. 4 is a flow diagram of a process according to some embodiments.
Figure 11:
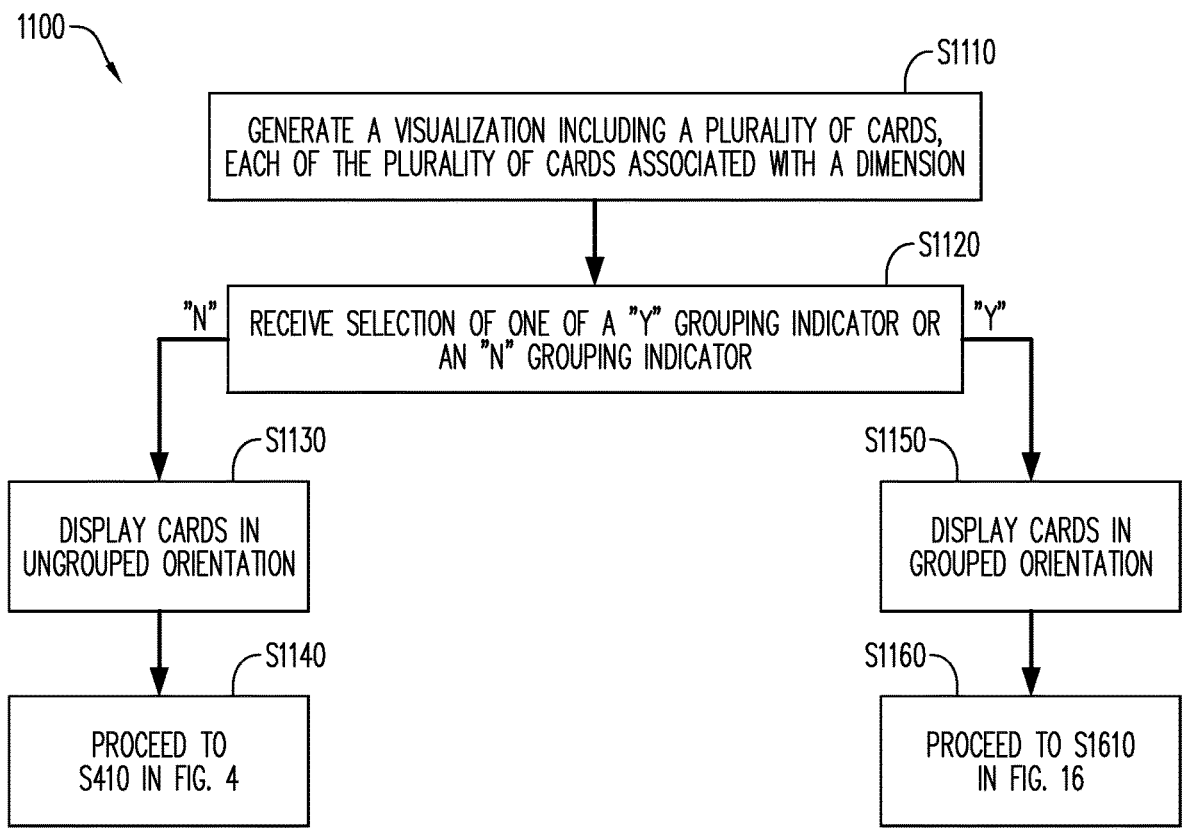
FIG. 11 is a flow diagram of a process according to some embodiments.
Figure 16:
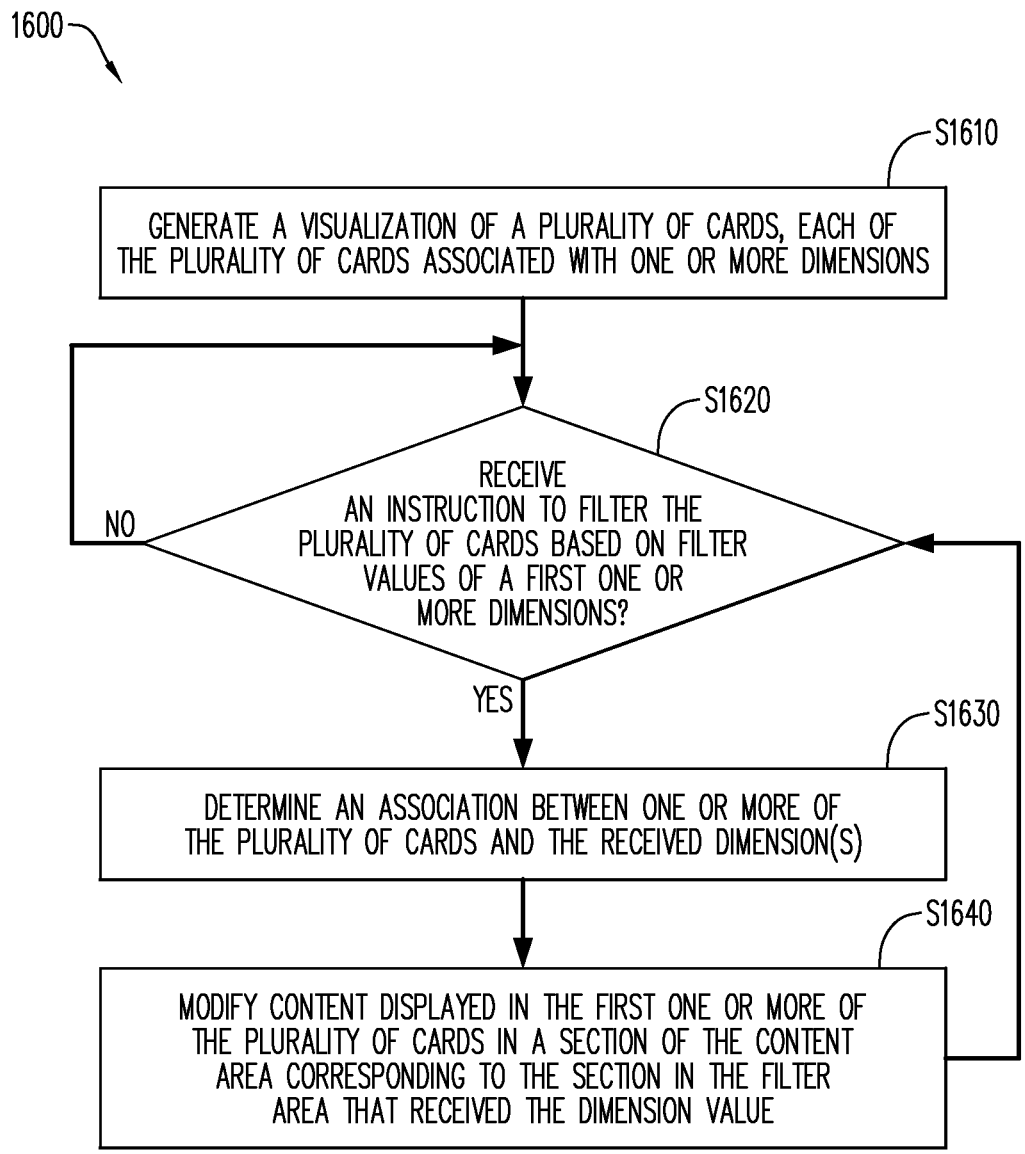
FIG. 16 is a flow diagram of a process according to some embodiments.

FIGS. 4, 11 and 16 illustrate a method 400/1100/1600 of modifying a visualization of a plurality of cards to indicate at least one of the cards is not associated with a selected dimension; modifying a visualization of a plurality of cards based on selection of a grouping schema; and modifying and updating a visualization of a plurality of cards, respectively, in accordance with an example embodiment. For example, the method 400/1100/1600 may be performed by a database node, a cloud platform, a server, a computing system (user device), a combination of devices/nodes, or the like, according to some embodiments. In one or more embodiments, the user device 500 or application server 730 (FIG. 7) may be conditioned to perform the process 400/1100/1600, such that a processing unit 1735 (FIG. 17) of the system 1700 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Turning to FIG. 4, initially, at S410, a visualization of a plurality of cards is generated. Each of the cards displays at least one dimension and value for the dimension. In one or more embodiments, a dimension filter module 745 (FIG. 7) may include the filterable dimensions for each card in a table 600 (FIG. 6), as received from a user (e.g., developer, system administrator, etc.). Based on the table 600, a filter bar may include the dimensions and associated user entry fields for the cards. Then in S420, it is determined whether an instruction to filter the plurality of cards based on filter values of a first one or more dimensions is received. In some embodiments, receipt of the instruction may include receipt of a value in the user entry field for at least one dimension and selection of a "Go" button 110. In some embodiments, receipt of the instruction may include receipt of a value in the user entry field for at least one dimension, without further action, in a live update mode.

In a case it is determined in S420 that the instruction is not received, the process 400 continues to display the plurality of cards in the visualization.

In a case it is determined at S420 that the instruction is received, the process 400 proceeds to S430. In S430, the dimension filter module 745 determines an association between one or more of the plurality of cards and the received dimension. A card may be associated with a dimension in a case that the card includes displayed content that may be modified by changes to the dimension.

The dimension filter module 745 may make the determination based on the values in a table 600. The table 600 (FIG. 6) may include an indication of which dimension may be applicable for a given card. For example, the table 600 shows that for Cards A, B and C, Cards A and B include the Currency Display dimension, Cards A, B and C include the company code dimension, and only Card B includes the Supplier dimension. In the case of a value input for the Currency Display dimension, the dimension filter module 745 may determine, based on the table 600, that Cards A and B are associated with the Currency Display dimension.

Next, in S440, the visualization is dynamically modified on the user interface to emphasize one or more cards based on the association. For example, the modified visualization may emphasize the association by modifying the cards that are not associated with the first one or more dimensions received in the instruction. For example, with the Currency Display dimension, Card C may be modified to be blurred out, thereby emphasizing Cards A and B because Cards A and B are updated with changes to their displayed content.

As will be appreciated, in some embodiments, the cards that are updated with changes to their content may be modified to emphasize the updates. For example, Cards A and B may be modified to be larger than Card C, or highlighted in a different color than Card C, or the like, to emphasize Cards A and B because cards A and B are updated with changes to their content.

After modification of the display in S440, the process 400 may return to S420 to determine whether further instructions are received.

Figure 5:
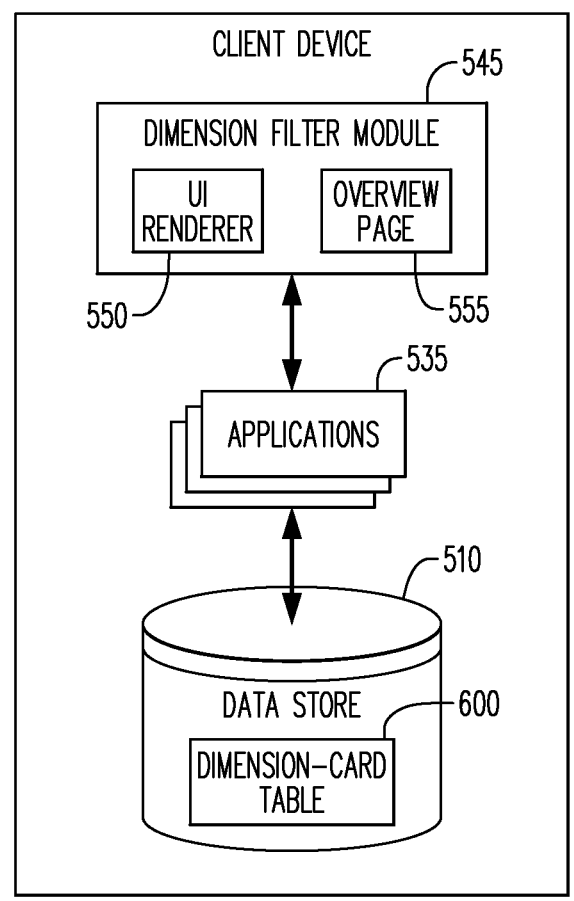
FIG. 5 is a block diagram of a user device according to some embodiments.

FIG. 5 illustrates a user device 500 according to some embodiments. User device 500 may include one or more applications 535 and a dimension filter module 545, and a data store 510. The dimension filter module 545 may include a UI renderer 550 and an overview page 555. The data store 510 may include a dimension-card table 600 (FIG. 6). The one or more applications 535 may execute via a Web Browser executing on the user device. The application 535 may be executed on the user device 500 to display a user interface on the user device 500, as generated by the UI renderer 550, for example. The user interface may display a visualization of analytical information such as charts, graphs, tables, and the like, based on underlying data. The underlying data may be stored in the data store 510. For example, an application 535 may be an overview page application that generates an overview page (e.g., the Overview Page (OVP)® provided for SAP Fiori®). The application 535 may receive a user input of log-in information. Based on a user-role linked to the log-in information, the application returns an overview page including a plurality of cards to be rendered by the UI renderer 550 as a visualization on the user interface. Each card is a container for application content and may represent an entry-level view of the most pertinent app data for a given topic or issue. Selection of the card may access the underlying application that is the source of the data displayed on the card. The underlying applications may be stored on the user device or on a server accessible by the user device. A visualization of the cards, as generated by the UI renderer, may be modified, per program code of the dimension filter module 545, based on receipt of filter dimension values and a database of filter dimensions as described herein. (e.g., the database 600 in FIG. 6). Although not shown in FIG. 5, a processor may control the components of the user device 500.

Referring to FIG. 6, a table (dimension-card table) is shown that represents the database 600 that may be stored either on the user device or on a server accessible by the user device according to some embodiments. Note that the database described herein is only one example, and additional and/or different information may be stored therein. Moreover, various databases might be split or combined in accordance with any of the embodiments described herein. The table may include, for example, entries identifying the dimensions associated with a particular card. The table may define fields 602, 604, 606 and 608 for each of the entries. The fields 602, 604, 606 and 608 may, according to some embodiments, specify: Card ID 602, Dimensions 604, Measures 606, and Layout information 608. The database 600 may be created and updated, for example, when an overview page is created and/or updated with new/removed cards. The table may include a ranking or weight that is given to a dimension by the dimension filter module 745 during the modification process, as indicated by the number in parentheses following the dimension name (e.g., Currency (1)). For example, if values are received for two dimensions, the dimension filter module 745 may apply the filter based on the rank. The rank may be predefined by an administrator/developer or may be user-configurable.

The Card ID 602 may identify a particular card displayed on the user interface. The Dimensions 604 may define the dimensions that are associated with a particular card. As described above a card and dimension may be associated in a case that the card includes displayed content that may be modified by changes to the dimension. A dimension is a qualitative value for data (such as names, dates, geographical data, currency, etc.) A dimension may be used to categorize, segment and reveal details in data. Measures 606 may contain numeric, quantitative values that you can measure for the data. Layout information 608 might comprise data indicating a fixed layout of the cards, with a predefined width and height or a resizable layout of the cards.

Figure 7:
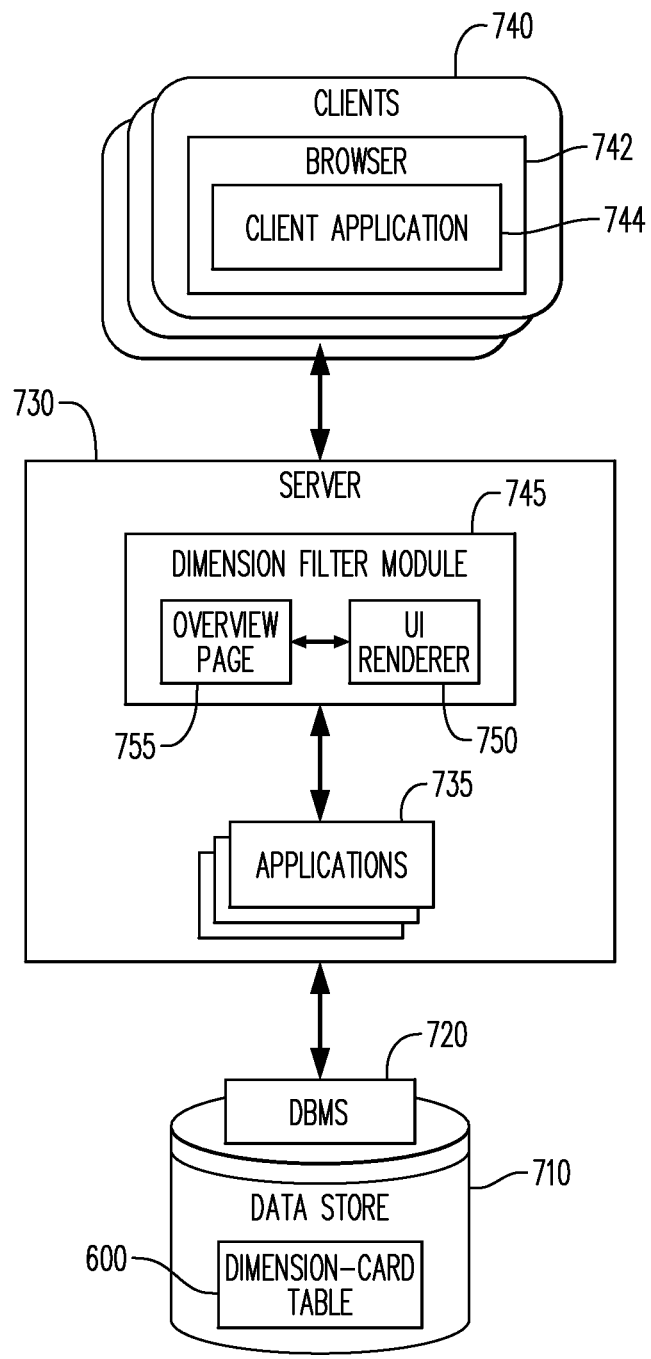
FIG. 7 is a diagram illustrating a database system architecture according some embodiments.

FIG. 7 is a system architecture 700 in accordance with an example embodiment. It should be appreciated that the embodiments are not limited to architecture 700, for example, the architecture shown in FIG. 5, or to a database architecture, however, FIG. 7 is shown for purposes of example. Referring to FIG. 7, the architecture 700 includes a data store 710, a database management system (DBMS) 720, a server 730, server applications 735, clients 740, and a dimension filter module 745 (including a UI renderer 750 and an overview page 755). Generally, server applications 735 executing within server 730 receive requests from clients 740 and provide results to the clients 740 based on data stored within data store 710. Server applications 735 may comprise server-side executable program code (e.g., compiled code, scripts, etc.) which provides functionality (e.g., receiving a request via a drag-and-drop operation, data entry, and then retrieving data from the data store 710 based on the request, processing the retrieved data and providing the data via a user interface to clients 740). A client 740 may access the dimension filter module 745 executing with the server 730 to update the visualization that is displayed on the user interfaces via application of one or more filters. In some embodiments, the client 740 may be running a browser 742, which is running a client application 744. The client application 744 may send a user interface request (or other suitable request) to a server-side or back-end application ("server application") 735 for execution thereof. For example, when a user clicks on a button or enters information via a UI of the client application 744, a request is sent to the server 730. The server then responds with what needs to be rendered/content that is then provided to the client application. For example, as shown here, the client application 744 communicates with the overview page 755, which in turn communicates with the server applications 735 to retrieve data therefrom. The overview page 755 interacts with the UI renderer 750 to generate the visualization of the retrieved data for display on the user interface at the client 740.

The server 730 provides any suitable interfaces through which the clients 740 may communicate with the dimension filter module 745 or applications 735 executing on server 730. Server 730 may include a Hyper Text Transfer Protocol (HTTP) interface supporting a transient request/response protocol over Transmission Control Protocol/Internet Protocol (TCP/IP), a Web Socket interface supporting non-transient full-duplex communications which implement the Web Socket protocol over a single TCP/IP connection, and/or an Open Data Protocol (OData) interface. Server 730 may be separated from or closely integrated with DBMS 720. A closely-integrated server 730 may enable execution of applications 735 completely on the database platform, without the need for an additional server. For example, server 730 may provide a comprehensive set of embedded services which provide end-to-end support for Web-based applications. Server 730 may provide application services (e.g., via functional libraries) which applications 735 may use to manage and query the database files stored in the data store 710. The application services can be used to expose the database data model, with its tables, views and database procedures, to clients 740. In addition to exposing the data model, server 730 may host system services such as a search service, and the like.

Raw data (e.g., documents, tables, training data, etc.) from various sources may be stored in the data store 710. In this example, an application 735 may extract data from the raw dimension data values for display in the cards. The dimensions and data values may be stored as database tables within the data store 710.

One or more applications 735 executing on server 730 may communicate with DBMS 520 using database management interfaces such as, but not limited to, Open Database Connectivity (ODBC) and Java Database Connectivity (JDBC) interfaces. These types of applications 735 may use Structured Query Language (SQL) and SQL script to manage and query data stored in database 710.

DBMS 720 serves requests to retrieve and/or modify data of database 710, and also performs administrative and management functions. Such functions may include snapshot and backup management, indexing, optimization, garbage collection, and/or any other database functions that are or become known. DBMS 720 may also provide application logic, such as database procedures and/or calculations, according to some embodiments. This application logic may comprise scripts, functional libraries and/or compiled program code. DBMS 710 may comprise any query-responsive database system that is or becomes known, including but not limited to a structured-query language (i.e., SQL) relational database management system.

Data store 710 may be any query-responsive data source or sources that are or become known, including but not limited to a SQL relational database management system. Data store 710 may include or otherwise be associated with a relational database, a multi-dimensional database, an Extensible Markup Language (XML) document, or any other data storage system that stores structured and/or unstructured data. The data of data store 710 may be distributed among several relational databases, dimensional databases, and/or other data sources. Embodiments are not limited to any number or types of data sources.

In some embodiments, the data of data store 710 may include files having one or more of conventional tabular data, row-based data, column-based data, object-based data, and the like. According to various aspects, the files may be database tables storing data sets. Moreover, the data may be indexed and/or selectively replicated in an index to allow fast searching and retrieval thereof. Data store 710 may support multi-tenancy to separately support multiple unrelated clients by providing multiple logical database systems which are programmatically isolated from one another. Furthermore, data store 710 may support multiple users that are associated with the same client and that share access to common database files stored in the data store 710.

Data (e.g., data records, data entries, documents, etc.) may be stored, modified, deleted, and the like, within the data store 710. As an example, data may be created, written, modified, or deleted based on instructions from any of the applications 735, and the like. Each piece of data may be assigned a globally unique identifier (GUID) by an operating system, or other program of the database. The GUID is used to uniquely identify that data from among all other data stored within the database. GUIDs may be created in multiple ways including, but not limited to, random, time-based, hardware-based, content-based, a combination thereof, and the like.

The architecture 700 may include metadata defining objects which are mapped to logical entities of data store 710. The metadata may be stored in data store 710 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 740 may include one or more devices executing program code of an application for presenting user interfaces to allow interaction with server 730. The user interfaces of applications may comprise user interfaces suited for reporting, data analysis, and/or any other functions based on the data of data store 710. Presentation of a user interface may include any degree or type of rendering, depending on the type of user interface code generated by server 730. For example, a client 740 may execute a Web Browser to request and receive a Web page (e.g., in HTML, format) from server 730 via HTTP, HTTPS, and/or Web Socket, and may render and present the Web page according to known protocols.

One or more of clients 740 may also or alternatively present user interfaces by executing a standalone executable file (e.g., an .exe file) or code (e.g., a JAVA applet) within a virtual machine. Clients 740 may execute applications which perform merge operations of underlying data files stored in data store 710. A user interface may be used to display a visualization of underlying data records, and the like.

In embodiments, the dimension filter module 745 may receive filter values for dimensions and modify a visualization based on these received values to emphasize to the user which cards on the user interface were affected by/associated with the filter, as described in the processes 400, 1100, 1600 described herein with respect to FIGS. 4, 11, 16. The dimension filter module 745 may include a UI renderer 750 and an overview page 755. The UI renderer 550 may be any suitable UI renderer to generate a frame from the application (e.g., overview page application) and display it on the screen as a user interface. The overview page 755 may generate a visualization that is rendered as an interactive user interface and may include different data elements that are targeted to a specific user and may provide that user with a summary and may include content from different sources shown side-by-side, without the user needing to switch screens. The overview page may bring together information from different sources that support a specific task or information need. Each topic or task may be represented on the visualization of the overview page by a card (or content container), and may be visualized in different ways (e.g., texts, charts, lists, tables). The overview page may act as a UI framework for organizing multiple cards on a single page.

Figure 8:
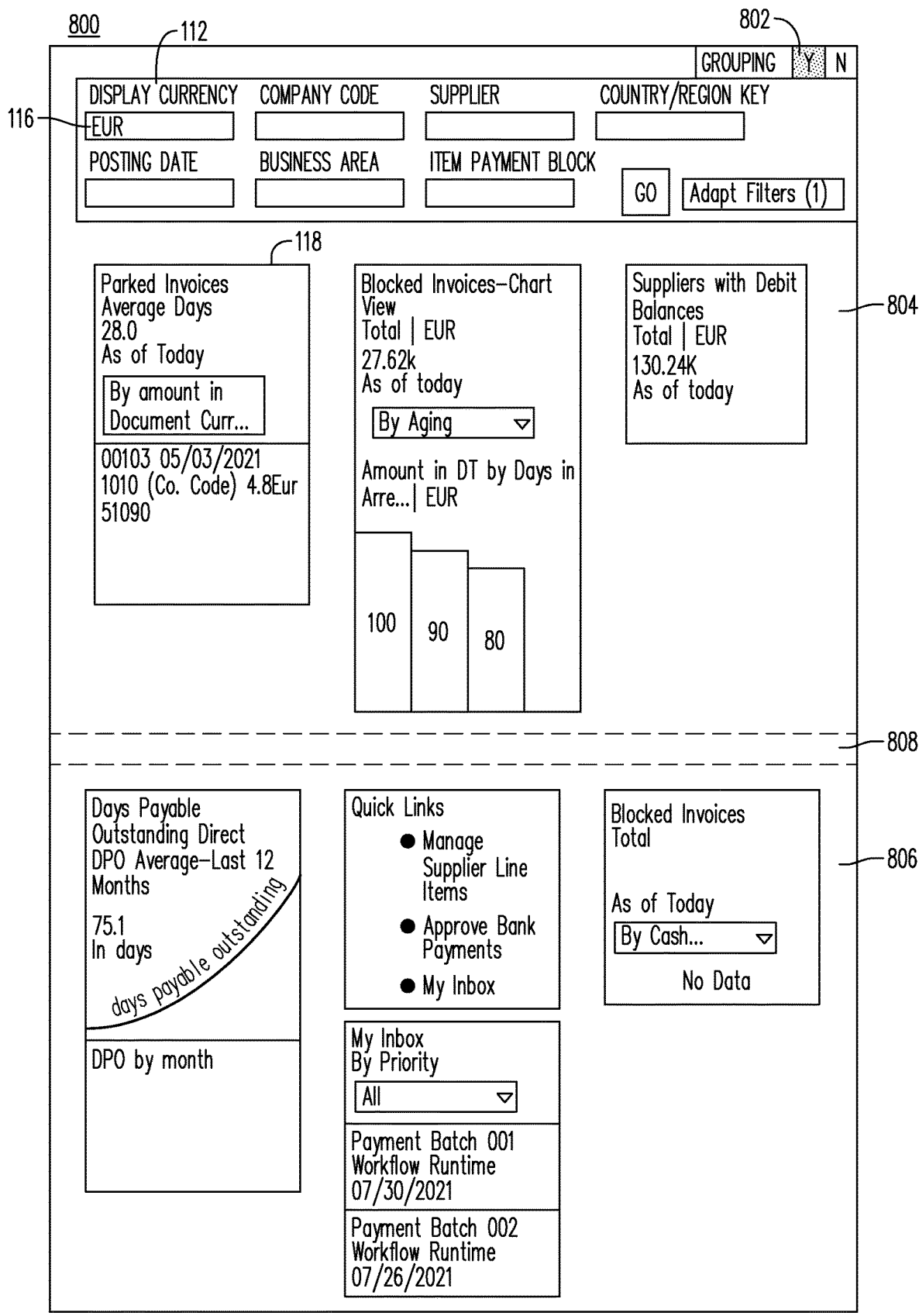
FIG. 8 is a diagram illustrating the user interface of FIG. 1B after execution of the modification and including rearranging the display according to some embodiments.

FIG. 8 illustrates a modified visualization in user interface 800, in accordance with some embodiments. Here, the modified visualization reflects the selection of "yes/active" for a "Y" grouping indicator 802 and the application of the filter values, for example EUR in the Display Currency dimension to the cards. A plurality of cards 118 are displayed on the visualization at the user interface 800. Each of the cards 118 displays at least one dimension and the received value in the user entry field for the dimension. As described above, in FIG. 1B, the user entered a value 116 of "EUR" in the Display Currency dimension 112. Based on execution of application of the filter value 116 to the cards 118 (e.g., via user selection of the "Go" button 110 or automatically in a live update mode, as described above), the visualization of the cards is dynamically modified. In particular, as compared to the cards 118 shown in FIG. 1B, the cards 118 in FIG. 8 have been modified/updated based on application of the filter value 116.

Here, the visualization of the cards is modified by rearranging the position of the cards such that the cards that include content affected by the EUR value (e.g., are associated with the EUR value) are moved together to a top portion 804 of the user interface 800, below the filter bar, and the cards that do not include content affected by the EUR value (e.g., are not associated with the EUR value) are moved together to a bottom portion 806 of the user interface 800. In some embodiments, a middle portion 808 of the user interface, between the top portion 804 and the bottom portion 806, may be kept blank to further emphasize the difference between the affected cards and the non-affected cards. Here, the Parked Invoices Card, Blocked Invoices—Chart Card, and Suppliers with Debit Balances Card are moved to the top portion 804, as they each include "EUR", while the Days Payable Outstanding Directed DPO Average Card, the Quick Links Card, the Blocked Invoices Card and the My Inbox Card are moved to the bottom portion 806. Separating the cards emphasizes the cards based on the association and, for example, allows the user can easily observe which cards were updated.

Figure 9:
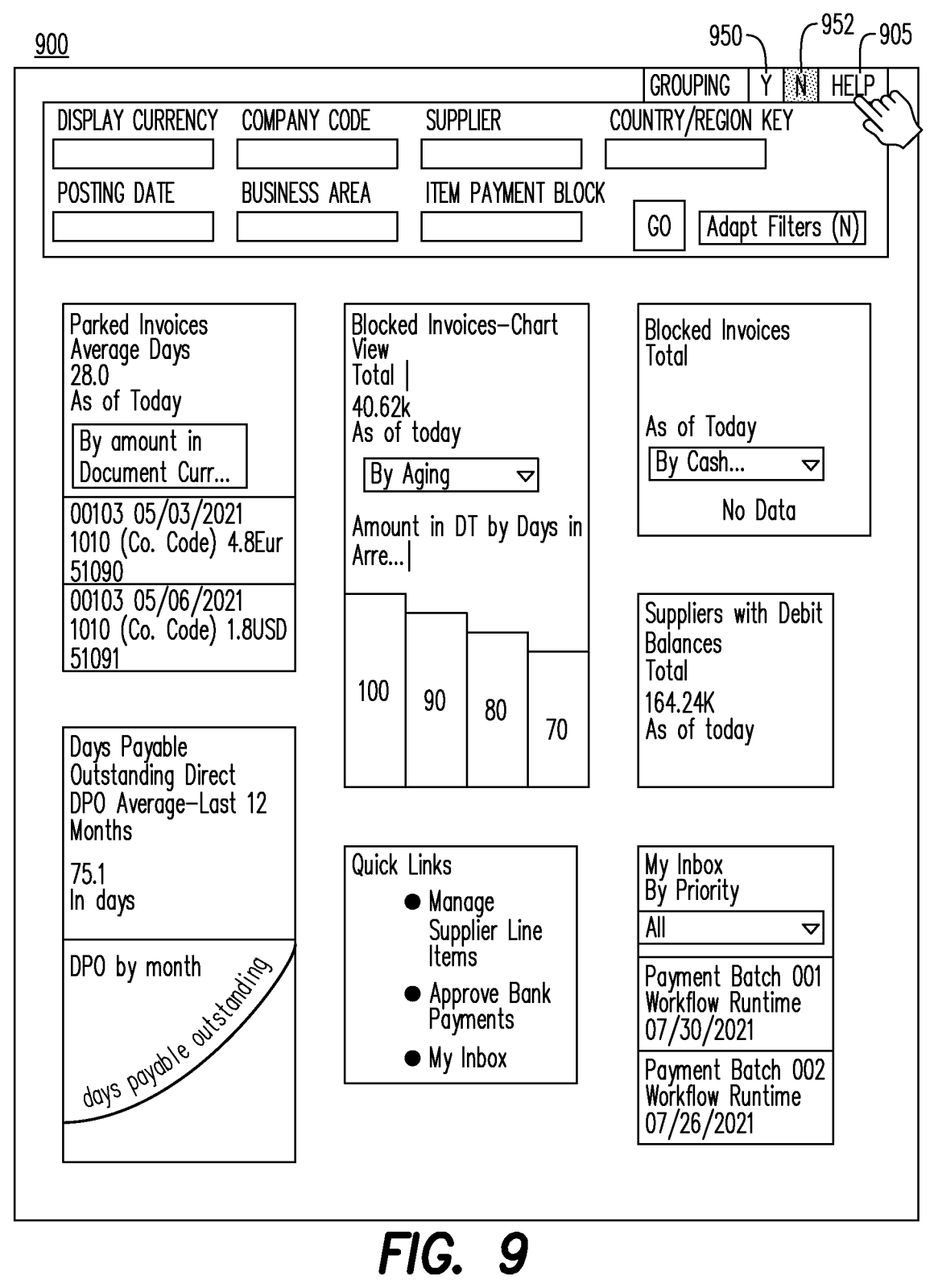

FIG. 9 illustrates a visualization of a user interface 900, in accordance with some embodiments. Here, the user interface reflects the selection of a "N" (e.g., "inactive") grouping indicator 952. The user interface 900 also includes a help button 905 above the filter bar. Selection of the help button 905 (e.g., via a cursor (as shown), touch screen, etc.) may return a list of dimension filters and the cards affected by them as shown in a window 1002 of the visualization of user interface 1000 shown in FIG. 10.

The window 1002 may be embedded within a template of the user interface 1000 and not a separate window. As another option, the window 1002 may be a separate window that pops-up after the help button 905 is selected (FIG. 9). The window 1002 includes the dimensions listed in the filter bar, and for each dimension, the cards that include content that may be affected by/associated with application of a filter to that dimension. Here the window 1002 lists a dimension filter 1004 in one column and the related cards 1006 in an adjacent column. As another example, the dimension filters may be provided in a row, as column headings for example, and the cards may be listed in multiple horizontal rows.

Turning to FIG. 11, a process 1100 for modifying a visualization of cards based on selection of a grouping schema is provided. Initially, at 51110, a visualization including a plurality of cards is generated. Each of the cards displays at least one dimension and value for the dimension. Then in S1120, selection of one of a "Y" grouping indicator 950 and a "N" grouping indicator 952 is received. In some embodiments, selection of the "Y" grouping indicator 950 may turn a grouping function "on"/"active", while selection of the "N" grouping indicator 952 may turn the grouping function "off"/"inactive". The selection is visualized on the user interface by shading, or otherwise marking, the selected "Y" grouping indicator 950 or the "N" grouping indicator 952. It will be appreciated that other interactive and selectable indicators may be used (e.g., "On" and "Off", etc.), and that other indications of the received selection may be used (e.g., bold, underlined, etc.).

In a case selection of the "N" grouping indicator is received at S1120, the process proceeds to S1130 and the visualization as shown in FIG. 1A is provided, with the cards in an ungrouped orientation. Selection of the "N" grouping indicator is shown, for example, in FIGS. 9 and 10. Then the process 1100 may continue to S1140 and proceed as process 400, described above. It is noted that while in this example, the visualization may initially be provided as that shown for selection of an "N" grouping indicator, in other examples, the visualization may initially be provided as that shown for a "Y" grouping indicator. It is further noted that if no selection is made at S1120, the visualization will remain as the initially provided schema.

Figure 12:
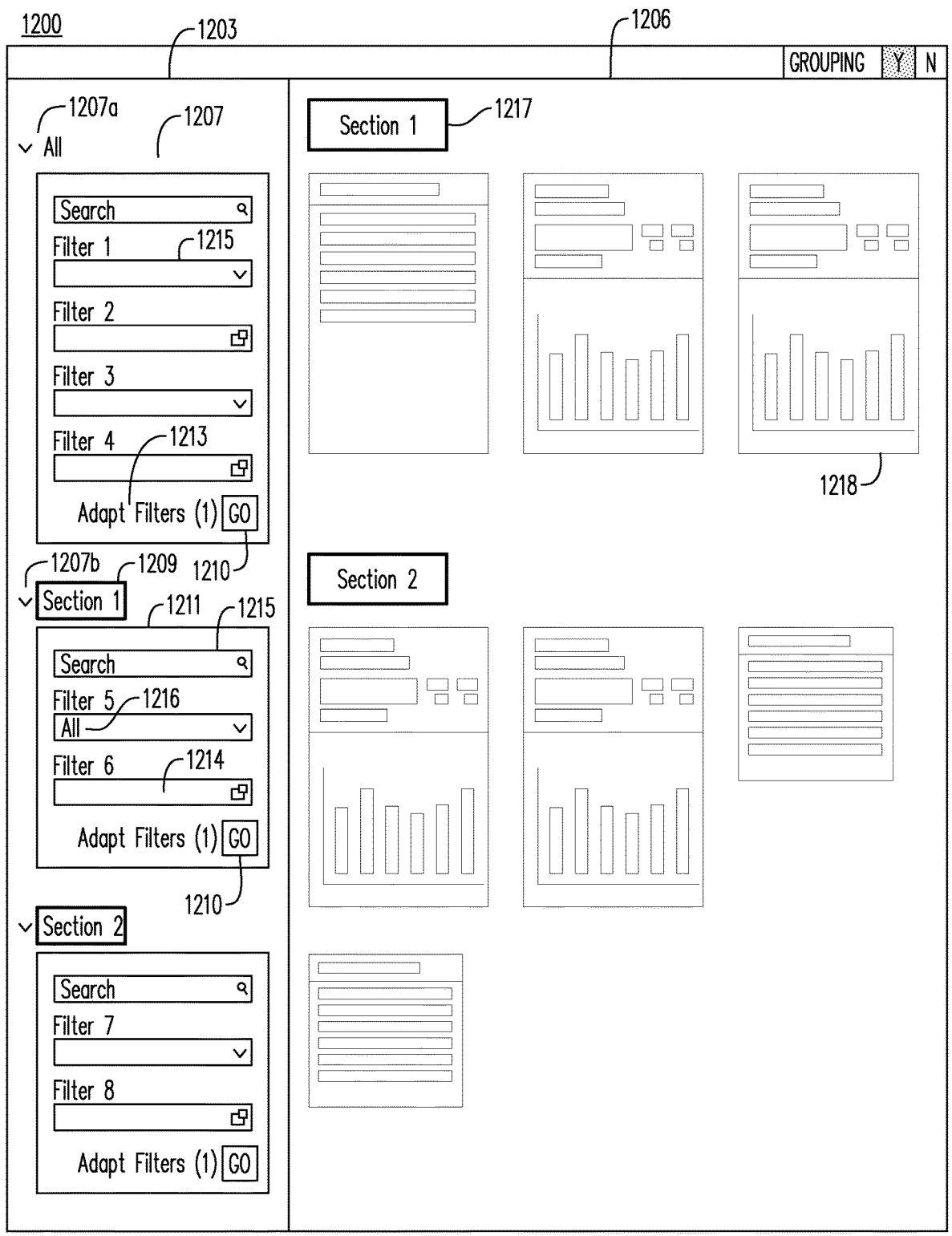
FIG. 12 is a diagram illustrating a user interface including selection of a "Y" grouping indicator according to some embodiments.
Figure 13A:
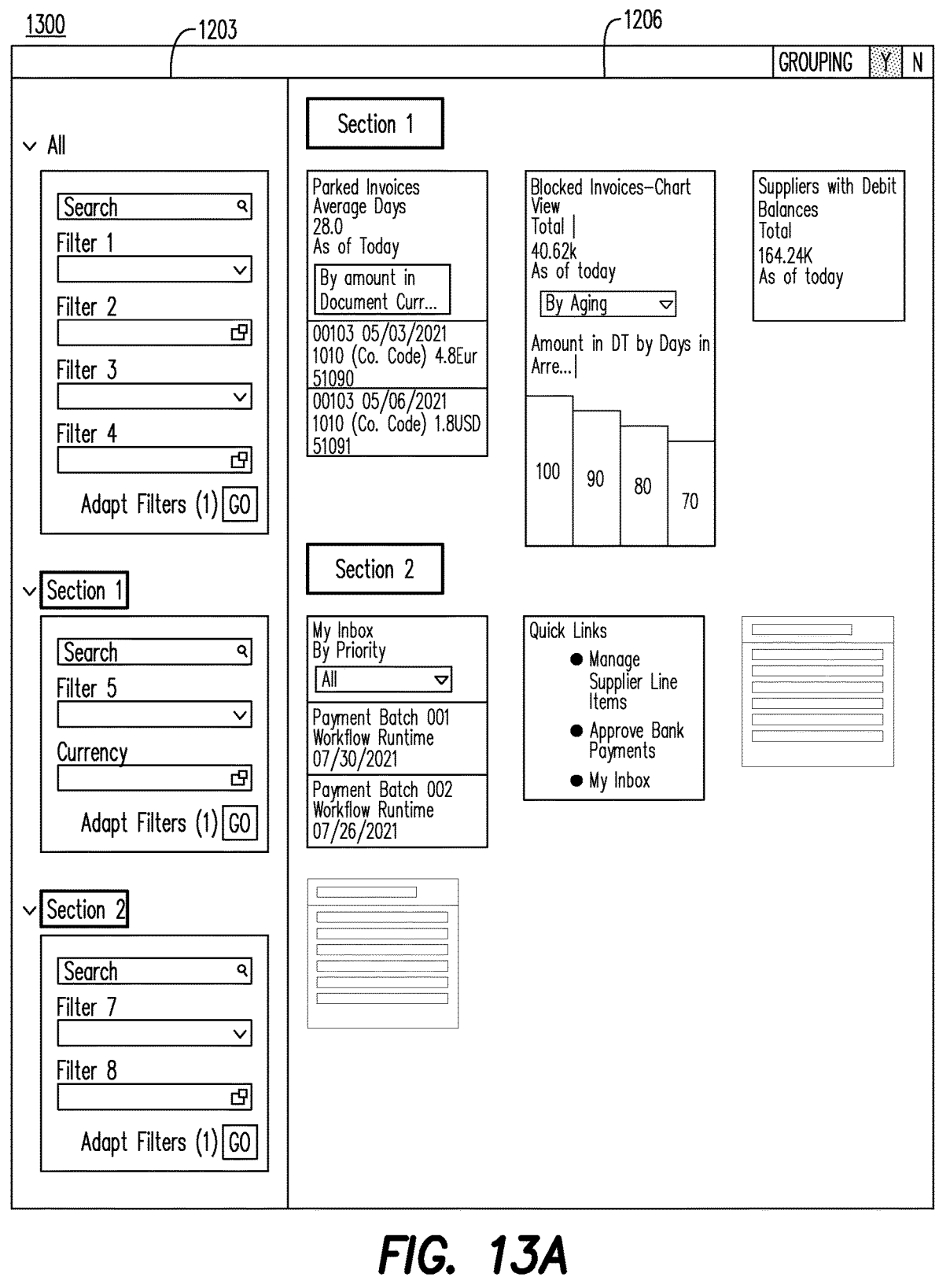
Figure 13B:
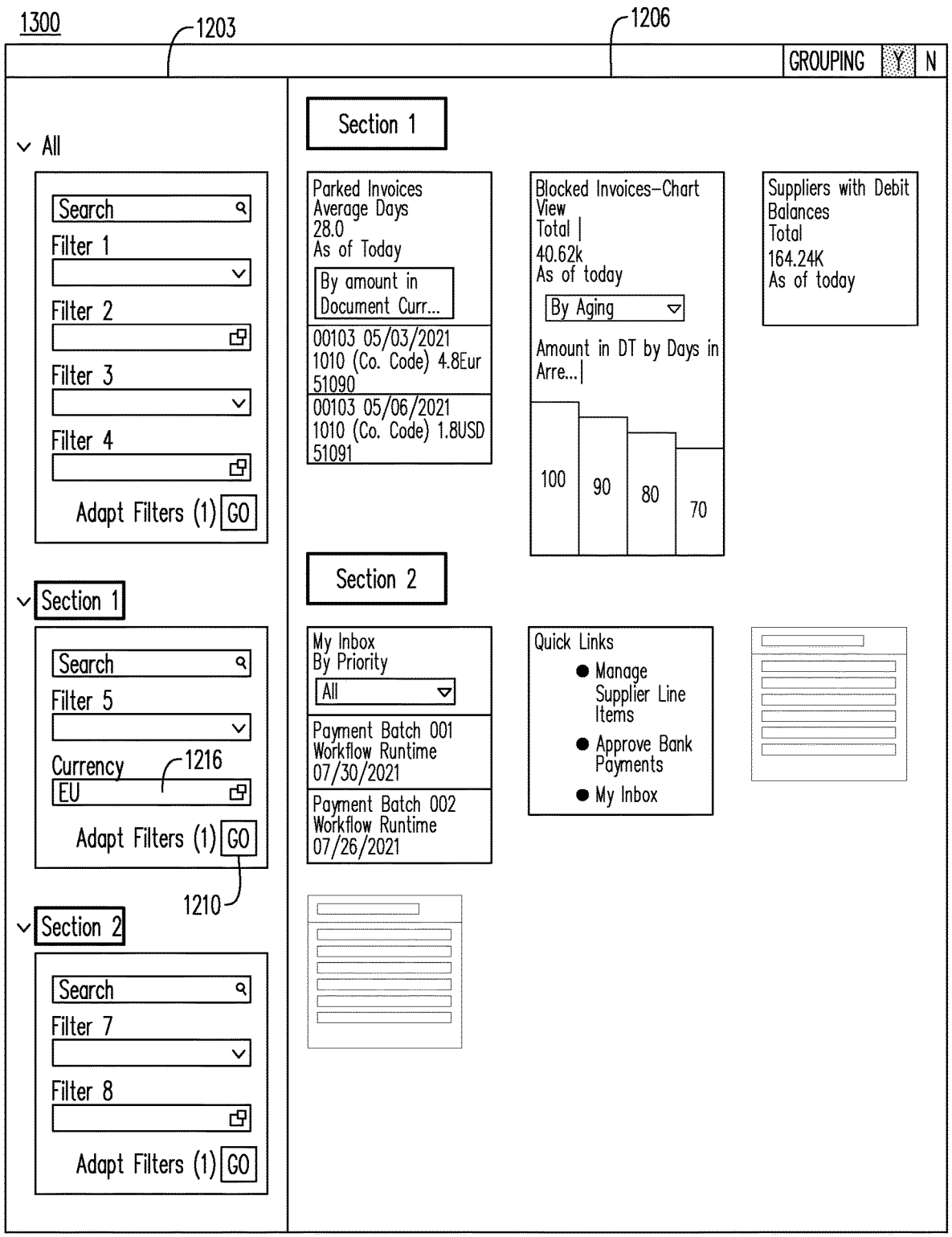
FIG. 13B is a diagram illustrating the user interface of FIG. 13A including a value in Section 1 according to some embodiments.
Figure 14:
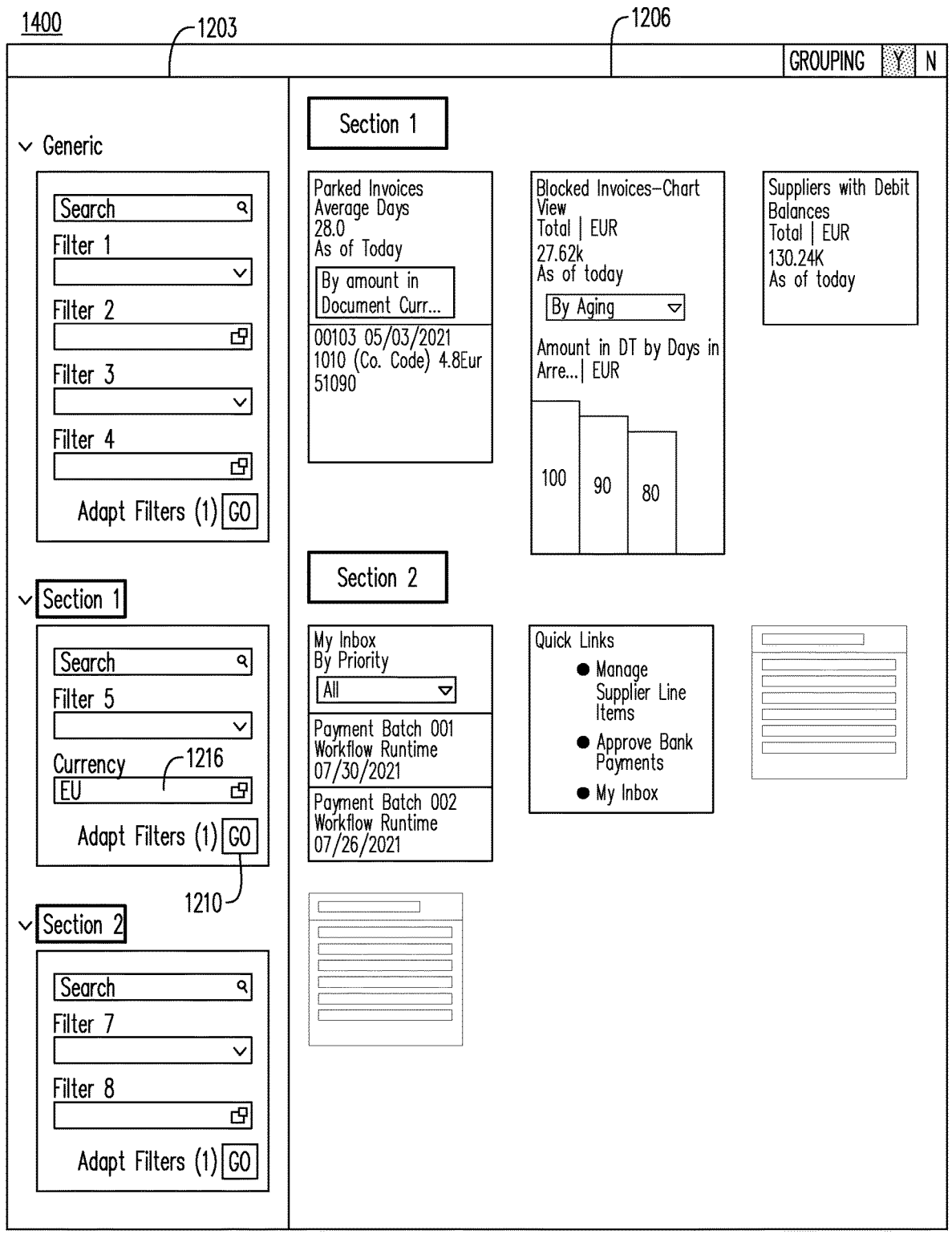
FIG. 14 is a diagram illustrating the user interface of FIG. 13B after execution according to some embodiments.

In a case selection of the "Y" grouping indicator is received at S1120, the process proceeds to S1150 and the visualization is as shown, for example, in FIGS. 12-14, with the cards in a grouped orientation. Then the process 1100 may continue to S1160 and proceed as process 1600, described below.

FIG. 12 illustrates a non-exhaustive example of a template 1200 including a visualization of an overview page in a grouping orientation, that may be manipulated by a user. In the examples of FIGS. 13A and 13B, the examples are directed to different outputs in response to user manipulation. However, it should be appreciated that the example embodiments are not limited to manipulations of these particular types (e.g., filter) or values (e.g., EUR). Other suitable types and values may be used.

Referring to FIG. 12, the visualization of the overview page may include a filter area 1203 and a content area 1206. The filter area 1203 and the content area 1206 may be different panes or part of a same pane.

The filter area 1203 may include two or more sections 1207a-n. A first section 1207a may be an "all card" section that includes dimensions displayed on all of the cards. A second section 1207b may include one or more dimensions that are displayed on less than all of the cards. The dimensions in the second to n sections 1207b-n may commonly be found on the same cards, resulting in their grouping into the given section. In one or more embodiments, the dimension filter module 745 may determine which dimensions are in a particular section based on a table 15 (FIG. 15) of dimensions and sections. The table 1500 may group the cards into sections based on the dimension/filter criteria. For example, cards associated with similar business reasons/tasks may have similar filters applied thereto, and these cards may be in a same group. The table 1500 may group the cards into sections based on other reasons. The table 1500 may have a section field 1502, a dimension field 1504 and a card field 1506. These dimensions also may have ranks or weights, as described above. It will also be appreciated that while the example described herein includes the dimension filter module 745 determining which dimensions are in a particular section of the filter area, in some embodiments a user may create his own groupings prior to application of the filters, by moving the dimensions (e.g., via drag and drop, etc.).

Each section may include a section label 1209. The filterable dimensions included in a given section are listed in a frame 1211, for example. A user-entry field 1214 may be proximate each dimension. A value 1216 for the filterable dimension may be received in the user-entry field 1214 to modify the cards, as described further below. Each frame 1211 may, in some embodiments, include a "Go" button 1210 to execute the filtering for the cards in that section based on the values received in the user-entry fields. Each frame may include a filter count indicator 1213 ("adapt filters") indicating a count of the number of filters currently applied. In one or more embodiments, each frame 1211 may also include a search bar 1215 that allows a user to input words, phrases, alphanumeric characters, etc., and search for values. The user may enter a search term or terms into the search bar 1215 and submit the terms (e.g., via a cursor, touch screen, selection of the "enter" key, etc.), which returns a set of search results. While this example shows a text-input based search bar 1215, the available search terms may be predefined and selected from a list/menu. For example, predefined terms may identify a currency type from among different currency types (EUR, USD, YEN, etc.) and the user may select one of the predefined types.

The content area 1206 may include the plurality of cards 1218. The content area 1206 may include a plurality of sections that correspond to the sections in the filter area 1203, with each section headed by a section label 1217 that corresponds to the section label 1209 in the filter area 1203. The plurality of cards 1218 are positioned in sections by the dimension filter module 745 based on the dimension sections. While not shown herein, the Sections in the filter area 1203 may be aligned in the visualization with the corresponding sections in the content area 1206 along a horizontal axis.

Turning to FIG. 13A, a visualization of user interface 1300 of an overview page in a grouping orientation, is provided, including three sections—an All section, Section 1 and Section 2 in the filter area 1203. Section 1 includes a Currency dimension, for example. The content area 1206 includes corresponding sections All, Section 1 and Section 2. The content area 1206 also includes groupings of cards per section. Here, Section 1 includes the Parked Invoices Card, the Blocked Invoices—Chart Card, and the Suppliers with Debit Balances Card; while Section 2 includes the My Inbox Card, the Quick Links Card and two other cards.

Turning to FIG. 13B, the visualization of FIG. 13A is provided, including the input of a value in one of the user entry fields for a filterable dimension. In this particular non-exhaustive example, the value "EUR" 1216 is input to the user entry field for the Display Currency filterable dimension in Section 1. To apply the value to the cards in corresponding Section 1 of the content area 1206, the user may select the "Go" button 1210, as shown herein.

Selection of the "Go" button 1210 (or in a live update mode, entry of a value) may result in the application of the value to the cards and the generation of a modified visualization.

A modified visualization 1400, in accordance with some embodiments, is shown in FIG. 14, and reflects the application of the filer values, for example EUR in the Display Currency dimension, to the cards. The modified visualization 1400 includes a plurality of cards. Each of the cards displays at least one dimension and value. As described above, in FIG. 13B, the user entered a value of "EUR" in the Display Currency dimension. Based on execution of application of the filter value to the cards (e.g., via user selection of the "Go" button 1210 or automatically in a live update mode, as described above), the visualization of the cards is dynamically modified. In particular, as compared to the cards shown in FIG. 13B, the cards in Section 1 of the content area in FIG. 14 have been modified based on application of the filter value (and the association between the card and the filter) to emphasize one or more cards. By using the corresponding sections in the filter area and the content area, the user can easily observe which cards were updated. That is, the user can quickly notice which cards were modified by simply noting the cards in the section that corresponds to the section in the filter area that received input value for the dimension. Thus, a user does not need to know which cards include that dimension value and may have been modified by application of the filter prior to application of the filter.

Turning to FIG. 16, initially, at S1610, and after the Y grouping has been selected as in FIG. 13A, a visualization including a plurality of cards is generated. Each of the cards displays at least one dimension and value for the dimension. Each of the cards is positioned in a particular section per assignment by the dimension filter module 745.

Then in S1620, it is determined whether an instruction to filter the plurality of cards based on filter values of a first one or more dimensions is received. In some embodiments, receipt of the instruction may include receipt of a value in the user entry field for at least one dimension and selection of a "Go" button 110. In some embodiments, receipt of the instruction may include receipt of a value in the user entry field for at least one dimension, without further action, in a live update mode.

In a case it is determined in S1620 that the instruction is not received, the process 1600 continues to display the plurality of cards in the visualization.

In a case it is determined at S1620 that the instruction is received, the process 1600 proceeds to S1630. In S1630, the dimension filter module 745 determines an association between one or more of the plurality of cards and the received dimension(s).

The dimension filter module 745 may make the determination based on the values in the table 1500. For example, the dimension filter module 745 receives a value for a particular dimension 1504, which is linked with a given section 1502 and one or more cards 1506 per the table 1500.

Next, in S1640, the content displayed in the first one or more cards of the plurality of cards in a section of the content area corresponding to the section in the filter area that received the dimension value is dynamically modified. For example, with Currency Display Dimension in Section 1 of the filter area, the content of all of the cards in Section 1 of the content area are updated to reflect the application of the filter value.

Figure 17:
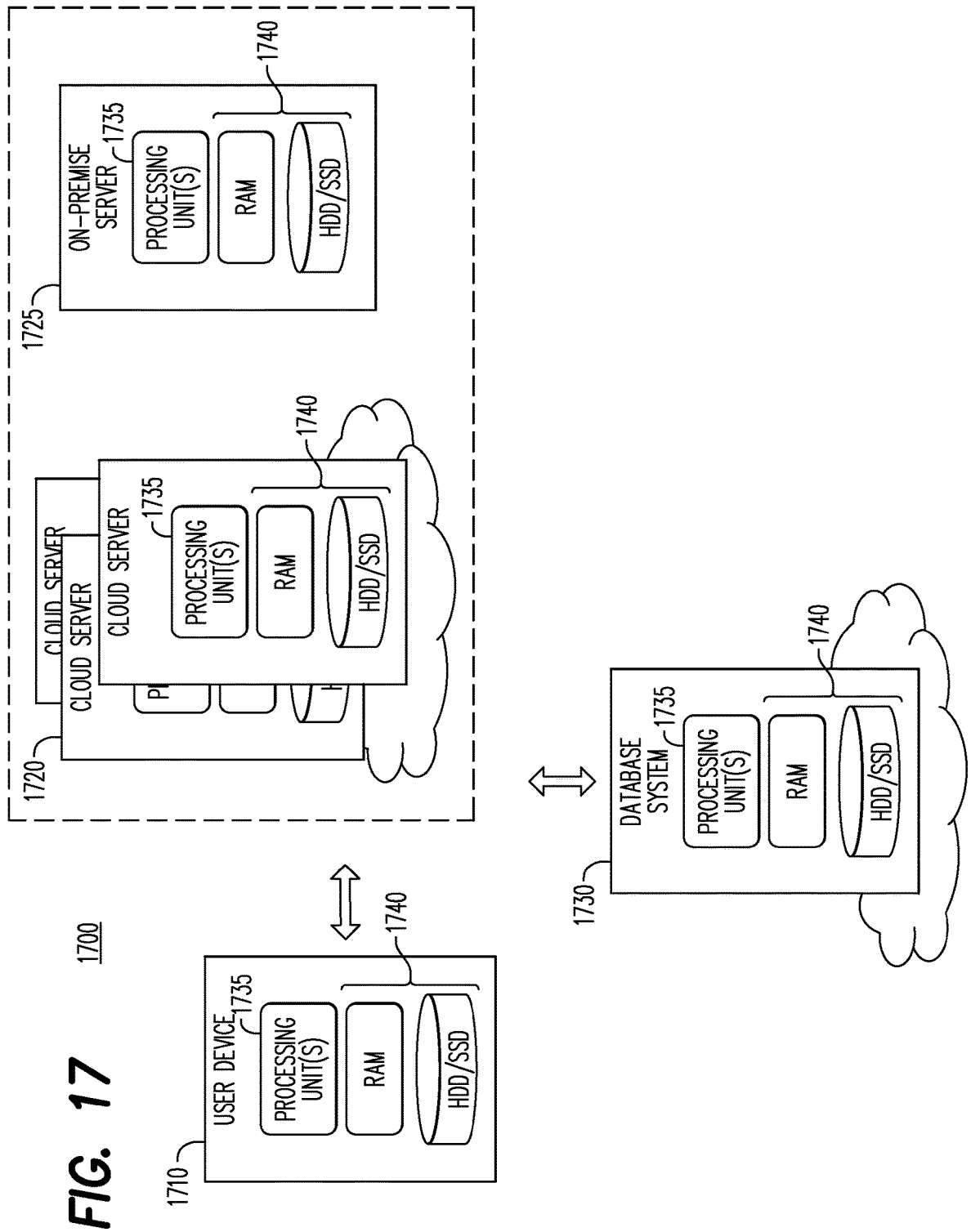
FIG. 17 is a block diagram of a cloud-based database deployment according to some embodiments.

FIG. 17 illustrates a cloud-based database deployment 1700 according to some embodiments. The illustrated components may reside in one or more public clouds providing self-service and immediate provisioning, autoscaling, security, compliance and identity management features.

User device 1710 may interact with applications executing on one of the cloud application server 1720 or the on-premise application server 1725, for example via a Web Browser executing on user device 1710, in order to create, read, update and delete data managed by database system 1730. Database system 1730 may store data as described herein and may execute processes as described herein to cause execution of application of dimension filters to modify cards displayed on the user device 1710. Cloud application server 1720 and database system 1730 may comprise cloud-based compute resources, such as virtual machines, allocated by a public cloud provider. As such, cloud application server 1720 and database system 1730 may be subjected to demand-based resource elasticity. Each of the user device 1710, cloud server 1720, on-premise server 1725, and database system 1730 may include a processing unit 1735 that may include one or more processing devices each including one or more processing cores. In some examples, the processing unit 1735 is a multicore processor or a plurality of multicore processors. Also, the processing unit 1735 may be fixed or it may be reconfigurable. The processing unit 1735 may control the components of any of the user device 1710, cloud server 1725, on-premise server 1725, and database system 1730. The storage devices 1740 may not be limited to a particular storage device and may include any known memory device such as RAM, ROM, hard disk, and the like, and may or may not be included within a database system, a cloud environment, a web server or the like. The storage 1740 may store software modules or other instructions/executable code which can be executed by the processing unit 1735 to perform the method shown in FIGS. 4, 11 and 16. According to various embodiments, the storage device 1740 may include a data store having a plurality of tables, records, partitions and sub-partitions. The storage device 1740 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
    a table including: (i) a list of a plurality of cards, and (ii) at least one dimension applicable to each card;
    a memory storing executable program code; and
    a processing unit to execute the executable program code to cause the system to:
        generate a visualization of the plurality of cards, wherein each card is a container including application content of a topic and each card displays at least one dimension;
        receive a value of a first dimension; and
        in response to reception of the value:
            access the table and determine one or more of the plurality of cards are associated with the first dimension based on a mapping in the table of the one or more cards to the first dimension; and
            dynamically modify the visualization by emphasizing the one or more of the plurality of cards associated with the first dimension based on the determination, wherein the dynamic modification further comprises:
                moving cards that do not include the received values to a first section of the visualization; and
                moving cards that do include the received values to a second section of the visualization.

2. The system of claim 1, wherein the program code is further executable to cause the system to:
    receive selection of a grouping indicator prior to modification of the visualization.

3. The system of claim 2, wherein dynamic modification of the visualization comprises:
    dynamic modification of the visualization in response to receipt of the selection of the grouping indicator as a first modification in a case the grouping indicator is selected as active, wherein modification of the visualization of cards based on the association is a second modification occurring after the first modification.

4. The system of claim 3, wherein the first modification comprises:
    creation of two or more groups, wherein a first group includes dimensions that are displayed on all of the cards, and a second group includes dimensions that are displayed on less than all of the cards; and
    generation of a first visualization including a first section and a second section, wherein the first section includes the first group and the second group, and the second section includes the one or more cards associated with the first group and the second group.

5. The system of claim 4, wherein the first section includes a first group label and a second group label, and the dimensions included in the first group are positioned below the first group label in the first visualization, and the dimensions included in the second group are positioned below the second group label in the first visualization.

6. The system of claim 5, wherein the second section of the first visualization includes:
a corresponding label of the first group label,
a corresponding label of the second group label,
the one or more cards associated with the first group positioned below the corresponding label of the first group label in the visualization, and
the one or more cards associated with the second group positioned below the corresponding label of the second group label.

7. The system of claim 6, wherein the received value of the first dimension is received in the first section for one of the first group and the second group.

8. The system of claim 7, wherein modification of the visualization based on the association generates a second visualization and wherein the program code is further executable to cause the system to:
update one or more cards included in the first group in a case the received value is received in the first section of the first group; and
update the one or more cards included in the second group in a case the received value is received in the first section of the second group.

9. The system of claim 1, wherein modification of the visualization based on the association comprises:
dynamic modification of the visualization by emphasizing one or more of the plurality of cards that does not include the received value.

10. The system of claim 9, wherein modification of the visualization by emphasizing one or more of the plurality of cards that does not include the received value further comprises one of:
blurring or shading each card that does not include the received value.

11. The system of claim 1, further comprising program code to cause the system to open a window that includes: 1. a description of each dimension, and 2. the cards that include each dimension.

12. The system of claim 1, wherein the plurality of cards included in the visualization is based on a user role.

13. The system of claim 1, wherein each card displays data related to a given topic.

14. A method comprising:
providing a table including: (i) a list of a plurality of cards, and (ii) at least one dimension applicable to each card;
generating a visualization of the plurality of cards, wherein each card is a container including application content of a top and each card displays at least one dimension;
receiving a value of a first dimension; and
in response to reception of the value:
accessing the table and determining one or more of the plurality of cards are associated with the first dimension based on a mapping in the table of the one or more cards to the first dimension; and
receiving selection of a grouping indicator,
dynamically modifying the visualization in response to the received selection in a case the grouping indicator is selected as active; and
dynamically modifying the visualization by emphasizing the one or more of the plurality of cards that is not associated with the first dimension based on the determination in a case the grouping indicator is selected as inactive or dynamically modifying the modified visualization by emphasizing the one or more of the plurality of cards that is not associated with the first dimension based on the determination in the case the grouping indicator is selected as active, wherein the modification comprises one of: blurring or shading each card that is not associated with the first dimension.

15. The method of claim 14, wherein, in the case the grouping indicator is selected as active, the dynamically modified visualization comprises:
creation of two or more groups, wherein a first group includes dimensions that are displayed on all of the cards, and a second group includes dimensions that are displayed on less than all of the cards; and
generation of a first visualization including a first section and a second section, wherein the first section includes the first group and the second group, and the second section includes the one or more cards associated with the first group and the second group.

16. The method of claim 15, wherein the received value of the first dimension is received in the first section for one of the first group and the second group.

17. The method of claim 16, wherein modification of the modified visualization further comprises:
updating one or more cards included in the first group in a case the received value is received in the first section of the first group; and
updating the one or more cards included in the second group in a case the received value is received in the first section of the second group.

18. A non-transitory, computer readable medium having executable instructions stored therein to perform a method, the method comprising:
providing a table including: (i) a list of a plurality of cards, and (ii) at least one dimension applicable to each card;
generating a visualization of the plurality of cards, wherein each card is a container including application content of a topic and each card displays at least one dimension;
receiving a value of a first dimension; and
in response to reception of the value:
accessing the table and determining one or more of the plurality of cards are associated with the first dimension based on a mappings in the table of the one or more cards to the first dimension; and
dynamically modifying the visualization by emphasizing the one or more of the plurality of cards that is not associated with the first dimension based on the determination, wherein the modification comprises one of: blurring or shading each card that is not associated with the first dimension.

\* \* \* \* \*